(12) United States Patent
Azanza Ladrón et al.

(10) Patent No.: US 10,990,776 B2
(45) Date of Patent: Apr. 27, 2021

(54) METHODS AND DEVICES FOR BIOMETRIC VERIFICATION

(71) Applicant: VERIDAS DIGITAL AUTHENTICATION SOLUTIONS, S.L., Tajonar (ES)

(72) Inventors: Eduardo Azanza Ladrón, Tajonar (ES); Miguel Ángel Sánchez Yoldi, Tajonar (ES); Francisco Julián Zamora Martínez, Tajonar (ES); Jose Luis González De Suso Molinero, Tajonar (ES)

(73) Assignee: VERIDAS DIGITAL AUTHENTICATION SOLUTIONS, S.L., Tajonar (ES)

( * ) Notice: Subject to any disclaimer, the term of this patent is extended or adjusted under 35 U.S.C. 154(b) by 0 days.

(21) Appl. No.: 16/761,238

(22) PCT Filed: Dec. 4, 2017

(86) PCT No.: PCT/EP2017/081317
§ 371 (c)(1),
(2) Date: May 1, 2020

(87) PCT Pub. No.: WO2019/086135
PCT Pub. Date: May 9, 2019

(65) Prior Publication Data
US 2020/0364428 A1    Nov. 19, 2020

(30) Foreign Application Priority Data

Nov. 3, 2017   (EP) ..................................... 17382739

(51) Int. Cl.
*G06K 7/14*   (2006.01)
*G06F 21/36*  (2013.01)
(Continued)

(52) U.S. Cl.
CPC ............ *G06K 7/1417* (2013.01); *G06F 21/36* (2013.01); *H04N 1/00334* (2013.01); *G06K 9/00885* (2013.01)

(58) Field of Classification Search
None
See application file for complete search history.

(56) References Cited

U.S. PATENT DOCUMENTS

2012/0138679 A1 *  6/2012  Doyle .............. G06K 19/06037
                                                      235/380
2013/0214043 A1    8/2013  Kong et al.

OTHER PUBLICATIONS

ISR and WO for International Application No. PCT/EP2017/081317, dated Jul. 20, 2018, 13 pages.
(Continued)

*Primary Examiner* — Kristy A Haupt
(74) *Attorney, Agent, or Firm* — Squire Patton Boggs (US) LLP

(57) ABSTRACT

Methods and devices for biometric verification are disclosed. During registration or encoding, a first vector representing biometric features of a subject is generated. Machine-readable optical labels based on the first vector are then generated. During validation or decoding, physical characteristics representative of the subject are captured, the physical characteristic containing biometric features of the subject. The biometric features are identified in the captured physical characteristics. A second vector representing the identified biometric features is generated. The machine-readable optical label is read to decode the first vector. The first vector is compared with the second vector to compute a match probability.

18 Claims, 8 Drawing Sheets

(51) Int. Cl.
*H04N 1/00* (2006.01)
*G06K 9/00* (2006.01)

(56) References Cited

OTHER PUBLICATIONS

International Labour Organization: Seafarers' Identity Documents Convention (Revised), 2003 (No. 185), Geneva 2006, (date is Jan. 1, 2006); 76 pages.

* cited by examiner

METHODS AND DEVICES FOR BIOMETRIC VERIFICATION

The present disclosure relates to biometrics and more specifically to biometric verification using machine-readable optical labels such as two-dimensional barcodes.

CROSS-REFERENCE TO RELATED APPLICATIONS

This application is a National Stage filing under 35 U.S.C. 071 of International Patent Application No. PCT/EP2017/081317, filed Dec. 4, 2017 and entitled "METHODS AND DEVICES FOR BIOMETRIC VERIFICATION," which claims the benefit of priority to European Patent Application EP17382739.5 filed Nov. 3, 2017, both applications of which are herein incorporated by reference in their entirety for all purposes.

BACKGROUND

Nowadays, digital information has become a key member of society, as it reaches every aspect of routine at work, at leisure time, at the administration and at practically every task performed daily. This fact has been particularly important thanks to the development of internet-enabled portable devices and the increase of their computing power, which has provoked them to be used in the same manner as computers.

Under this context, using the mobile phone to perform sensitive operations in terms of accessed information, the operation itself and confidentiality has also become more common among the users, it becoming a problem for developers as well, because information handling and processing in such situations emerge as also a sensitive matter.

For example, the Directive (EU) 2015/2366 on payment services in the internal market, commonly known as PSD2, introduced a new security requirement that shall be complied by payment services provided within the European Union, especially when the operations are performed online. This measure is called "strong customer authentication" and implies that an authentication is based on the use of two or more elements categorised as knowledge (something only the user knows), possession (something only the user possesses) and inherence (something the user is) that are independent, in that the breach of one does not compromise the reliability of the others, and is designed in such way as to protect the confidentiality of the authentication data.

Therefore, a convention has been stablished for information access protocols as a combination of at least two from the following three factors:

Checking "something that the user knows": This definition comprises the traditional password method (among others), in which some sort of verification related with knowledge of the user is verified.

Checking "something that the user has": This definition comprises verifications related with possessions of the user. One example of such security measure would be checking if the mobile phone being used for information access is the one owned by the user.

Checking "something that the user is": This definition comprises verification of biological feature measures of the user, the so-called biometry. One example of such security measure would be assessing the user's face.

Furthermore, biometric verification is a key factor in terms of user experience and interaction simplicity. Thus, biometry may be used as a fixed security factor in combination with one or more of the other two factors.

SUMMARY

This proposal presents a biometric verification method and system based on a machine-readable optical label which encodes the biometric data taken from a subject that verifies at least 2 from the 3 proposed security checking methods: "something that the user has" and "something that the user is". Biometric data can be classified depending on the type: face, voice, iris, fingerprint, tongue, teeth, nose, ears, veins, odour, sweat, genetic fingerprint, etc.

Any biometric verification relies on a process which obtains a feature vector describing the biometric data, and two or more feature vectors are compared. The major difference between different biometric types is on the mechanism used for vector extraction. Particularly, this vector receives a different name on different technologies: e.g., it is called an I-vector for voice biometrics or minutiae for fingerprints.

In a first aspect, a method for biometric verification is disclosed. The method comprises generating a first vector representing a biometric feature of a subject; generating a machine-readable optical label based on the generated first vector; capturing a physical characteristic representative of the subject, the physical characteristic containing the biometric feature of the subject; identifying the biometric feature in the captured physical characteristic; generating a second vector representing the identified biometric feature; reading the machine-readable optical label to decode the first vector; comparing the first vector with the second vector to generate a match probability.

The proposed procedure consists of two steps: first, biometric data of the subject is transformed into a features vector, and finally this vector is encoded as a sort of machine-readable optical label representation (e.g., a QR code); secondly, when verification is required, a new instance is captured and processed to obtain a new biometric features vector, and next, this new vector is compared with the one encoded in the label data in order to authenticate the subject or verify a credential (eg: ID document) belonging to the subject, thus accepting or denying user authorization.

As a main feature of the proposed method, it accepts performing biometric authentication on-site, as an alternative to performing it in a remote system (i.e.: server, cloud server, etc.). This schema enables avoiding establishing connections to a remote server, thus avoiding any derived security risk and privacy concerns, as no biometric feature is needed to be stored.

Thus, other key points of this disclosure are: the user credential for authentication may be revoked on demand or in a short-time span decided in the moment the credential is given; the disclosed system is low-cost as machine-readable optical labels may be printed in low-resolution and with black and white ink instead of grey-level/colour photographs; and finally, this verification procedure may be integrated as an additional security level and enables performing higher security checks by evaluating the meta-characteristics of the machine-readable optical label itself.

In some examples, the first vector may be generated by identifying biometric features in a physical characteristic previously captured. For example, it is possible to generate the first vector by extracting the biometric feature vector of a face printed on a photo.

In some examples, generating the first vector may comprise capturing a different instance of the physical characteristic of the subject.

In some examples, capturing the physical characteristic may comprise capturing one or any combinations of an image, an audio, a video, a biological or chemical sample (e.g., able to store genetic information), or any other sample of the subject. According to this multi-modal approach, different biometric feature types may be evaluated together in a holistic way before making any decision.

The physical characteristic may be one or more of a visual characteristic (such as a facial, a fingerprint, an eye or a palm characteristic), a vocal characteristic, a biological characteristic or a chemical characteristic.

The machine-readable optical label may comprise a two-dimensional barcode e.g. a quick-response (QR) code.

In some examples, the method may further comprise encrypting the first and/or the second vector. The encryption key may be something related with the user personal data, for instance, his identity document number, his date of birth, etc.

In another aspect, a method of activating an identity-associated credential is disclosed. Activating the identity-associated credential may comprise performing a method of biometric verification according to examples disclosed herein. The first vector may be generated when requesting the identity-associated credential. Then an image of the machine-readable optical label may be generated from the first vector and may be transferred on a document accompanying the identity-associated credential. The second vector may be generated when receiving the credential after capturing a physical characteristic representative of the subject. The credential may be activated by comparing the decoded first vector with the second vector, if the match probability exceeds a threshold.

In yet another aspect, a method of validating a credential with an in-printed biometric machine-readable optical label is disclosed. Validating the credential may comprise performing a method of biometric verification according to examples disclosed herein. The credential may carry an image of the machine-readable optical label. The machine-readable optical label from the credential may then be read to decode the first vector. The credential may then be validated by comparing the decoded first vector with the second vector, if the match probability exceeds a threshold.

In yet another aspect, a method of verifying a subject's identity with short-timespan use credentials is disclosed. Verifying a subject's identity with short-timespan use credentials may comprise performing a method of biometric verification according to examples disclosed herein. The short-timespan use credential may carry an image of the machine-readable optical label. The machine-readable optical label may then be read from the short-timespan use credential to decode the first vector. The identity of the subject may then be verified by comparing the decoded first vector with the second vector, if the match probability exceeds a threshold.

In yet another aspect, a method of accessing computer terminals, communication device equipment or communication device applications is disclosed. The method of accessing may comprise performing a method of biometric verification according to examples disclosed herein. The machine-readable optical label may be generated at the moment of creating subject user information to access a computer terminal, communication device or communication device application. The generated machine-readable optical label may then be stored or printed. To access the computer terminal, communication device or communication device application, the stored or printed machine-readable optical label may be provided to the computer terminal, communication device or communication device application. The first vector may be decoded. The computer terminal, communication device or communication device application may capture the biometric feature of the subject. The second vector representing the biometric feature may be generated. The identity of the subject may then be verified by comparing the decoded first vector with the second vector, if the match probability exceeds a threshold.

In yet another aspect, a method of authorizing access of service providers to premises is disclosed. The method of authorizing access of service providers to premises may comprise performing a method of biometric verification according to examples disclosed herein. The first vector may be generated when hiring the services provider. Then, an image of the machine-readable optical label may be generated from the vector. A credential carrying the printed machine-readable optical label may be generated. At premises, an electronic peephole may be used to read the machine-readable optical label and to capture a physical characteristic representative of the subject. The acquired machine-readable optical label and the biometric features may then be sent to a remote processing device. At the remote device, the service provider may then be authorized by comparing the decoded first vector with the second vector, if the match probability exceeds a threshold.

In yet another aspect, a device for biometric verification is disclosed. The device may comprise a memory to store an image of a machine-readable optical label, the machine readable optical label comprising a representation of a biometric feature of a subject; a capturing module to acquire a biometric feature of a subject; a decoding module to decode the machine-readable optical label and to reproduce a first vector; a biometric gateway to provide a second vector based on the captured physical characteristic; a comparing module to compare the first and the second vectors and to compute a match probability.

In yet another aspect, a system for biometric verification is disclosed. The system may comprise a device according to examples disclosed herein, a second capturing module to capture a physical characteristic containing biometric features of the subject; and a biometric engine module capable of generating biometric feature vectors.

In yet another aspect, a system for biometric verification is disclosed. The system may comprise means for generating a first vector representing a biometric feature of a subject; means for generating a machine-readable optical label based on the generated first vector; means for capturing a physical characteristic containing biometric features of the subject; means for identifying the biometric features in the captured physical characteristic; means for generating a second vector representing the identified biometric feature; means for reading the machine-readable optical label to decode the first vector; and means for comparing the first vector with the second vector to compute a match probability.

In yet another aspect, a non-transitory computer program product that causes a processor to perform biometric verification is disclosed. The non-transitory computer program product may have instructions to generate a first vector representing a biometric feature of a subject; generate a machine-readable optical label based on the generated first vector; capture a physical characteristic containing biometric features of the subject; identify the biometric features in the captured physical characteristic; generate a second vector representing the identified biometric feature; read the machine-readable optical label to decode the first vector; compare the first vector with the second vector to compute a match probability.

In yet another aspect, a computer program product is disclosed. The computer program product may comprise program instructions for causing a computing system to perform a method of biometric verification according to examples disclosed herein.

The computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the processes. The carrier may be any entity or device capable of carrying the computer program.

For example, the carrier may comprise a storage medium, such as a ROM, for example a CD ROM or a semiconductor ROM, or a magnetic recording medium, for example a hard disk. Furthermore, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or another device or means.

Alternatively, the carrier may be an integrated circuit in which the computer program is embedded, the integrated circuit being adapted for performing, or for use in the performance of, the relevant methods.

In yet another aspect, a computing device is disclosed. The device may comprise a memory and a processor. The memory may store computer program instructions executable by the processor. Said instructions may comprise functionality to execute a method of biometric verification according to examples disclosed herein.

DESCRIPTION OF THE DRAWINGS

Non-limiting examples of the present disclosure will be described in the following, with reference to the appended drawings, in which.

DETAILED DESCRIPTION OF EXAMPLES

Figure 1:
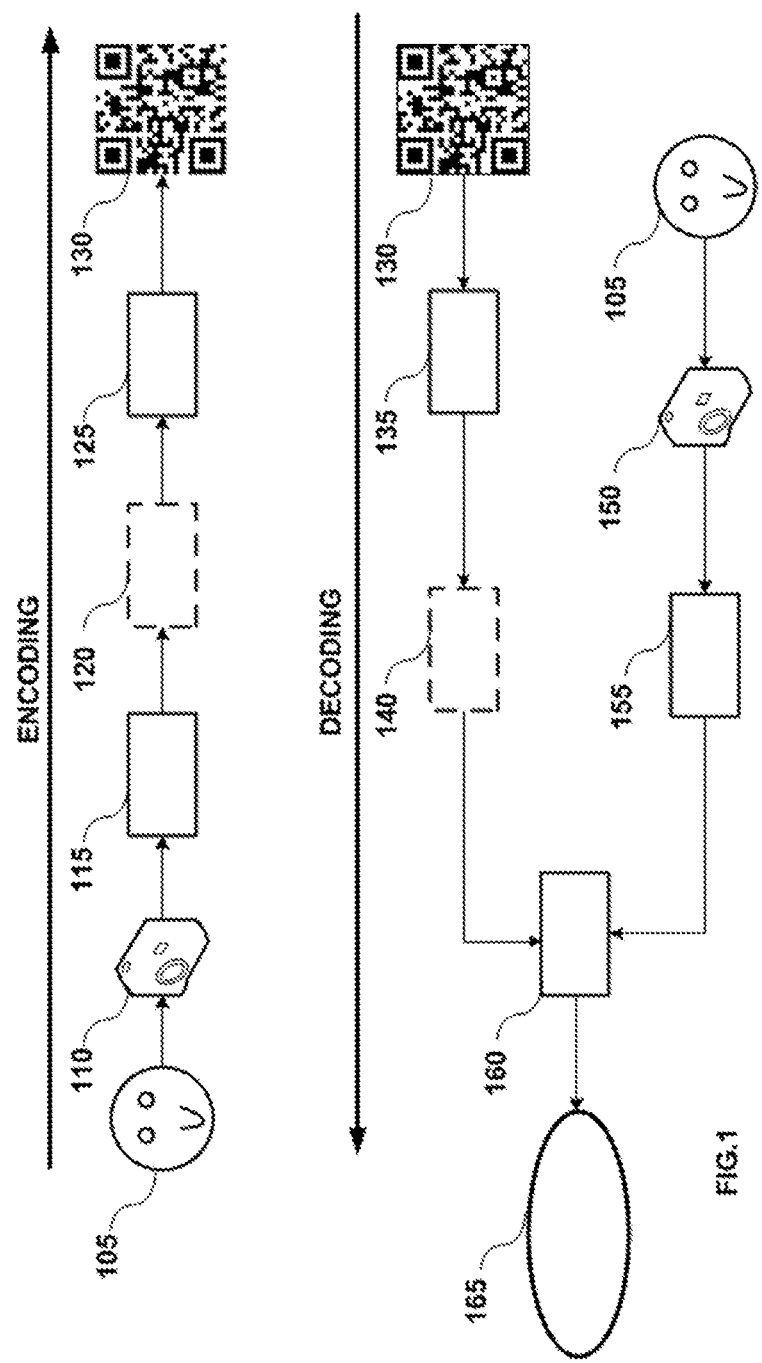
FIG. 1 is a flow chart of a biometric verification process, according to an example.

FIG. 1 is a flow chart of a biometric verification process according to an example. During an encoding mode of operation, the capturing module 110 may capture one or more physical characteristics of a subject 105. The capturing module 110 may be any type of electronic equipment with functionality to capture physical characteristics. For example the capturing module 110 may be an image capturing device (e.g. a camera, video-camera, electronic peephole etc.), a voice recording device (e.g. microphone) or a fingerprint sensor. It may also be any type of communication or electronic device with capturing functionalities (e.g. a mobile phone, a tablet, laptop or desktop computer with integrated microphone and/or camera etc.). The physical characteristics captured may be any physical characteristic containing a biometric feature. For example, it may be any of (or a combination of) a facial characteristic, a palm characteristic (e.g. a fingerprint), a vocal characteristic, or any other physical characteristic containing a biometric feature. A biometric engine 115 may receive a digital representation of the physical characteristic captured (e.g. in the form of a file) and extract the biometric feature(s) from the digital representation.

The biometric engine provides a biometric features vector using different automatic means. In particular, machine learning techniques are very successful to perform this kind of operation. The system is adjusted to discriminate two instances belonging or not to the same subject. These vectors are produced following these steps:

1. Biometric target location: using a model of the biometric target (e.g., fingerprint or face) a location of the object is computed over the biometric captured data.
    a. In voice biometrics, the target is to locate sequences of recorded signal where human voice is detected.
    b. In image-based biometrics, it is computed a bounding box where the target object is located.

2. Normalization: the biometric data is extracted from the rest of the data and normalized to reduce object variance.

3. Embedding computation: Mathematical processes are applied to obtain simplified representations of the normalized object (the so-called embeddings). This process can be done through:
    a. Deep neural networks, in the form of convolutional neural networks, can be used for face biometrics, which commonly provide 128 components-length embedding vectors.
    b. I-vector computation can be used for voice biometrics, which commonly provide 400 components-length embeddings of the voice signal, that can be further reduced to 192.
    c. Other dimensionality reduction processes that can be adjusted to convert iris, fingerprints, or other biometrics data into an embedding vector.

The biometric engine may be implemented as an end-to-end biometric engine system, in such a way each of the steps enumerated above are not explicitly programmed but learned from examples using machine learning techniques. Operating as an end-to-end system may require specifying a model structure which allows the execution of steps 1, 2 and 3, but the programmer may not need to code explicitly what needs to be done at each step.

The biometric engine 115 may be running on the same device as the capturing module 110 or it may reside in an external or remote server or in a cloud server. The capturing module 110 may be connected directly or wirelessly with the biometric engine 115. The biometric engine 115 may generate a feature vector representing the biometric feature. A version of the biometric engine 115 may also be included in the vector.

The vector may be optionally encrypted using encryption module 120 to increase the security of the biometric data, it is possible to encrypt the feature vector using a symmetric or asymmetric algorithm, which can use the person's data to generate a particular encryption key. The vector (either encrypted or unencrypted) may then be transformed by an encoder module 125 into a machine-readable optical label, e.g. a two-dimensional barcode such as a QR code 130.

When addressing the biometric authentication problem through machine-readable optical labels, it should be taken into account the trade-off between system performance, label size and the ability of the capture system to correctly read biometric faints. Particularly for this representation case, a trade-off between system performance and compactness of data in the representation is bound to occur.

Two possible solutions are proposed to turn the embedding feature vector (usually represented using 4 bytes of IEEE754 float numbers) to a machine-readable optical label, being both techniques able to compress the biometric information contained in the embedding vectors:

By directly encoding the embedding vector to a downsized resolution, which could be decreased to 2 bytes per component (16 bits float numbers) or even 1 byte per component (8 bits fixed point real numbers). For example, in face biometrics, its 128 embedding vector can be represented using 4096 bits using 4 bytes floats (128×4×8), 2048 bits using 2 bytes floats and 1024 bits using 8 bits fixed point representations. For these cases, a good trade-off between performance and space (which are inversely correlated) seems to exist on the 2 byte-representation per component.

By transforming the embedding vector, represented with float numbers, to a compact binary representation through machine learning techniques (i.e.: logistic regression+ thresholding).

Once a representation of the vector has been obtained (being full, downsized or transformed), it is written in binary format to a machine-readable optical label (like a QR matrix or similar), which is parametrized in terms of size and redundancy, affecting the ability to read the code properly and the available data budget to store the biometric embedding vector and any other required information.

For instance, the following sizes and qualities are possible for face biometrics using QR codes for their representation as machine-readable optical labels:

QR Version 17 with H redundancy. This version has 85×85 components and it can store up to 2264 bits.

QR Version 14 with Q redundancy. It has 73×73 components and can store up to 2088 bits.

QR Version 12 with M redundancy. This QR matrix has 65×65 components and allows to store up to 2320 bits.

QR Version 10 with L redundancy. This version has 57×57 components and stores up to 2192 bits.

Depending on the ability of the capture device to read a large QR, the system will be configured on one of this four QR versions. The version 12 with M redundancy case is particularly useful because 2320−2048=272 additional bits are available to store in the QR code additional information, e.g., metadata related to the capture device, capture timestamp, user personal data, expiration date, access permission data, location permission data, etc.

It should be noted from this explanation that, although examples have been posed describing machine-readable optical label conversion for a unique biometric features vector, this explanation could be generalizable to encoding more than one biometric features vector into the same label. This operation mode will entail selecting an adequate barcode format, in order to be capable of storing required information, with the needed resolution.

During a decoding mode of operation, a reader module 135 may read the machine-readable optical label 130 (e.g., a QR code) and decodes the vector. If the vector is encrypted, then a decrypting module 140 may decrypt the encoded vector and generate an unencrypted vector. In another branch of the procedure, which may be executed in parallel with label acquisition, a capturing module 150 may capture a physical characteristic of the subject 105. The capturing module 150 may be the same or different than the capturing module 110. It may however comprise functionality to capture the same physical characteristic as the capturing module 110. Then, the capturing module may send a digital representation of the physical characteristic captured to biometric engine 155. The biometric engine 155 may be the same as the biometric engine 115.

Covering the case in which the biometric engine could be updated at different time moments, the proposed framework considers the possibility that the biometric engine version is included into the machine-readable optical label besides the biometric features vector. Thus, during the encoding process, the biometric engine version is taken and concatenated to the biometric features vector, and both encoded into a machine-readable optical label.

Then, at the decoding process, the biometric engine version is obtained from the label and used to properly configure the biometric engine which is in charge of transforming the biometric information into a features vector to carry out the authentication process.

The biometric engine 155 may similarly generate a vector representing the biometric feature of the captured physical characteristic. Then the two vectors (the one decoded from the machine-readable optical label 130 and the other generated by the biometric engine 155 may be compared in comparator module 160. The comparator module 160 may compute a match probability 165 that may be used to authenticate the process and subsequently activate or validate a credential or provide access to equipment or premises as will be described below. The match/non-match decision relies on the comparison between the obtained feature vector for a particular authentication process and a reference one. This comparison can be made through any mathematical method that permits to take a decision in terms of the feature vector belonging to a particular person. Some examples of such method would be:

Computing the distance between the embedding vectors through the cosine or Euclidean distance-like metrics, which may be unbounded.

Computing a likelihood of the authentication feature vector belonging to the same person as the one of the reference vector.

Particularly, a score based on mathematical transformations of the previously described metrics (i.e.: sigmoid-like) can be obtained to enable thresholding the output score.

The capturing process may be an automatic capture process. The automatic capture process may consist in an iterative process that checks the compliance of the following statements:

1. Presence of the biometric feature under evaluation (i.e.: in the biometric authentication using faces, the process will look for the presence of a face within the image)

2. Relation between the biometric feature present in the signal and the rest of the information (i.e.: in the biometric authentication using faces, the process will evaluate the relation between the face and the background to check, among other things, if the face belongs to the person actively doing the authentication process). This relation is a measure of the relevance of the biometric feature in the capture.

Iteratively checking those two statements, the capture may be performed and validated whenever sufficient consistency over a sequence of iterations is reached.

Security measures may be in place to assure that both the registration (during the encoding) and the authentication (during the decoding) processes are properly held by a legit user and no attacks to the system or unwanted accesses happen. The proper security measures to apply may depend on two different factors.

The first factor to take into consideration is the location where the process of registration and/or authentication is being held. According to this, two approaches are considered:

Registration/authentication process in a controlled location

This case covers registration/authentication processes being held in a particular place. For instance, controlled locations would be police stations in which identification documents are expedited, bank offices in which bank accounts are created and/or accessed, etc.

On such locations, two possible situations may occur, leading each one to apply different security measures to ensure system performance in adequate conditions:

The registration/authentication process is supervised: This case covers situations in which the registration/authentication process is supervised by a human (i.e.: police controlling the process of identification document creation). Under such situation, the supervisor will be in charge of checking that no spoofing attacks are being performed (i.e.: use of masks or photos, voice replay attacks, etc.).

The registration process is unsupervised: This case covers situations in which the registration/authentication process is not supervised by a human. Under such situations, measures to counter spoofing attacks such as anti-spoofing systems or proof-of-life systems are optional (but recommended) to be added to the registration/authentication system.

Registration/authentication process in an uncontrolled location

This case covers registration/authentication processes being held anywhere, by the use of mobile apps, web services or any other dedicated application. Thus, in such cases, three levels of security may be added to the registration/authentication system:

Countermeasures to spoofing attacks by using masks, photos, voice replays, etc. are recommended to be added to the registration/authentication system to ensure safety.

Sending the machine-readable optical label content besides the captured physical characteristic to the remote server in order to perform biometric verification in exchange of an authentication token.

An additional level of authentication within the biometric registration/authentication system through a login (using username and password) or through authentication tokens (i.e.: vali-Das authentication system) to avoid unwanted accesses to the biometric registration/authentication system.

The second factor to take into account is the type of system which will be in charge of performing the biometric registration/authentication process. Specifically, these system-dependent security measures apply to accesses to the system in uncontrolled locations, where an additional level of authentication is required.

Local systems or remote systems without memory

When performing the biometric registration/authentication process locally (i.e.: within a mobile phone, tablet, or by using any dedicated application) or remotely with systems that not allow to store login information, the additional authentication level should be carried out by using login information (user and password) or through authentication tokens.

Remote systems with memory

When performing the biometric registration/authentication process remotely with systems that allow to store login information, the additional authentication level should be carried out by receiving both the machine-readable optical label and the biometric capture for establishing the comparison. This way, the biometric features vector in the label is used as the user's identifier (which is stored to assure not registered users from entering), and the biometric capture is used as the password (or the other way around). As using the biometric capture as a password poses risks in terms of security, methods for spoofing detection and proof-of-life systems are recommended.

Figure 2:
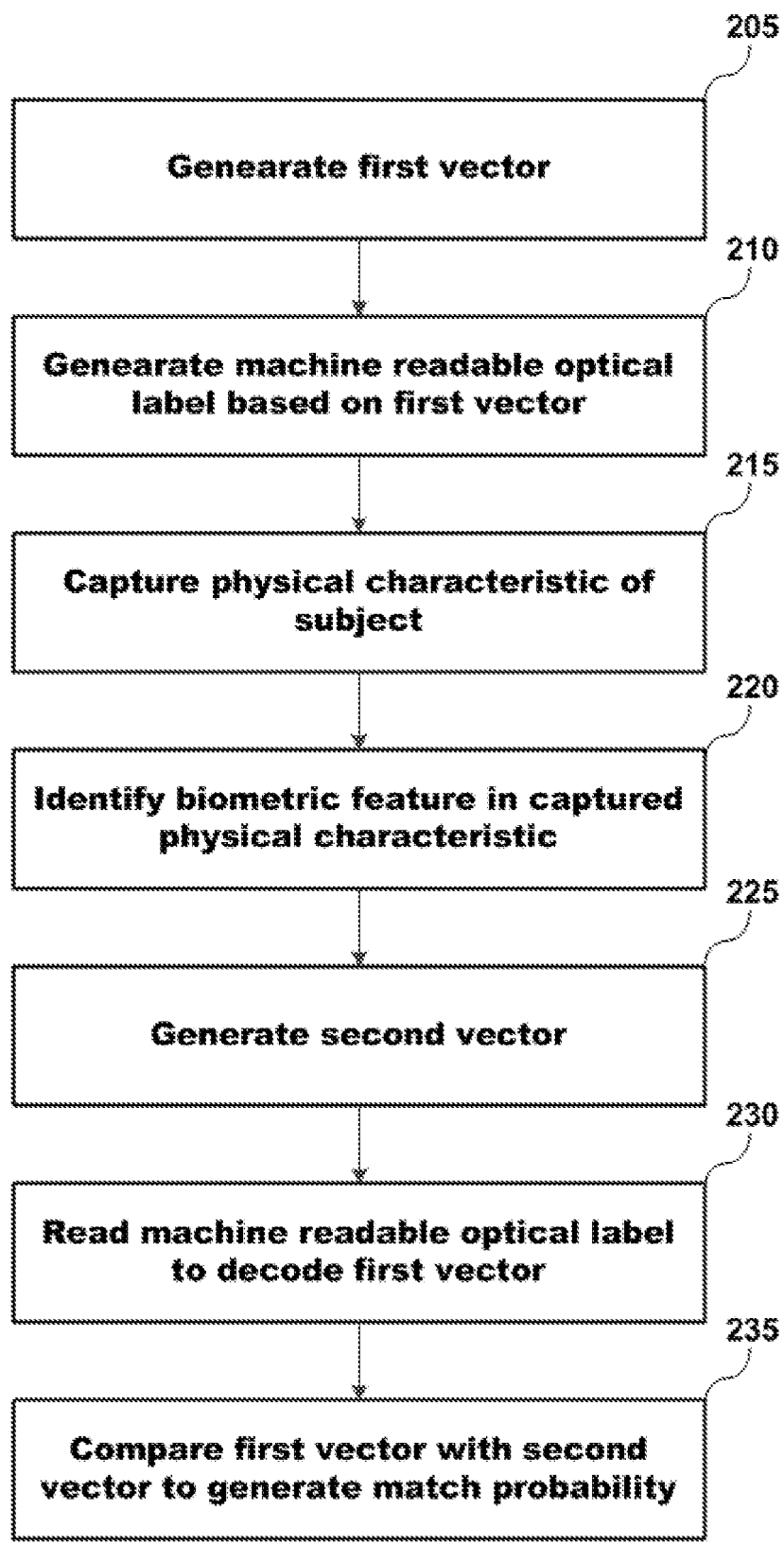
FIG. 2 is a flow chart of a method for biometric verification, according to an example.

Various use cases will be described for the proposed biometric authentication system based on machine-readable optical labels. All cases share a common process for biometric verification. FIG. 2 is a flow chart of a method for biometric verification of a subject, according to an example. In block 205 a first vector representing a biometric feature of the subject is generated. In block 210, a machine-readable optical label based on the first vector is generated. In block 215, a physical characteristic representative of the subject is captured. The physical characteristic may contain the biometric feature of the subject. In block 220, the biometric feature in the captured physical characteristic is identified. In block 225, a second vector representing the identified biometric feature is generated. In block 230 the machine-readable optical label is read to decode the first vector. In block 235 the first vector is compared with the second vector to generate a match probability.

It is important to consider that this use cases description only covers the authentication system steps needed to gather and process the biometric information in order to assess the biometric authentication. Thus, all security concerns in terms of how the system ensures a safe registration/authentication are not described here, as a description of those has already been done hereinbefore.

The first family of use cases is about activating an identity-associated credential. This use case affects the activation of credentials which are meant to be used by a particular user (credit cards, season-passes for transports, events, places, services, etc.), whose identity will be authenticated through validating a machine-readable optical label (QR, etc.) which may contain biometric information and which is provided to the user alongside the credential in physical format. This delivery could be done either physically or via postal services or services of similar sort.

Figure 3:
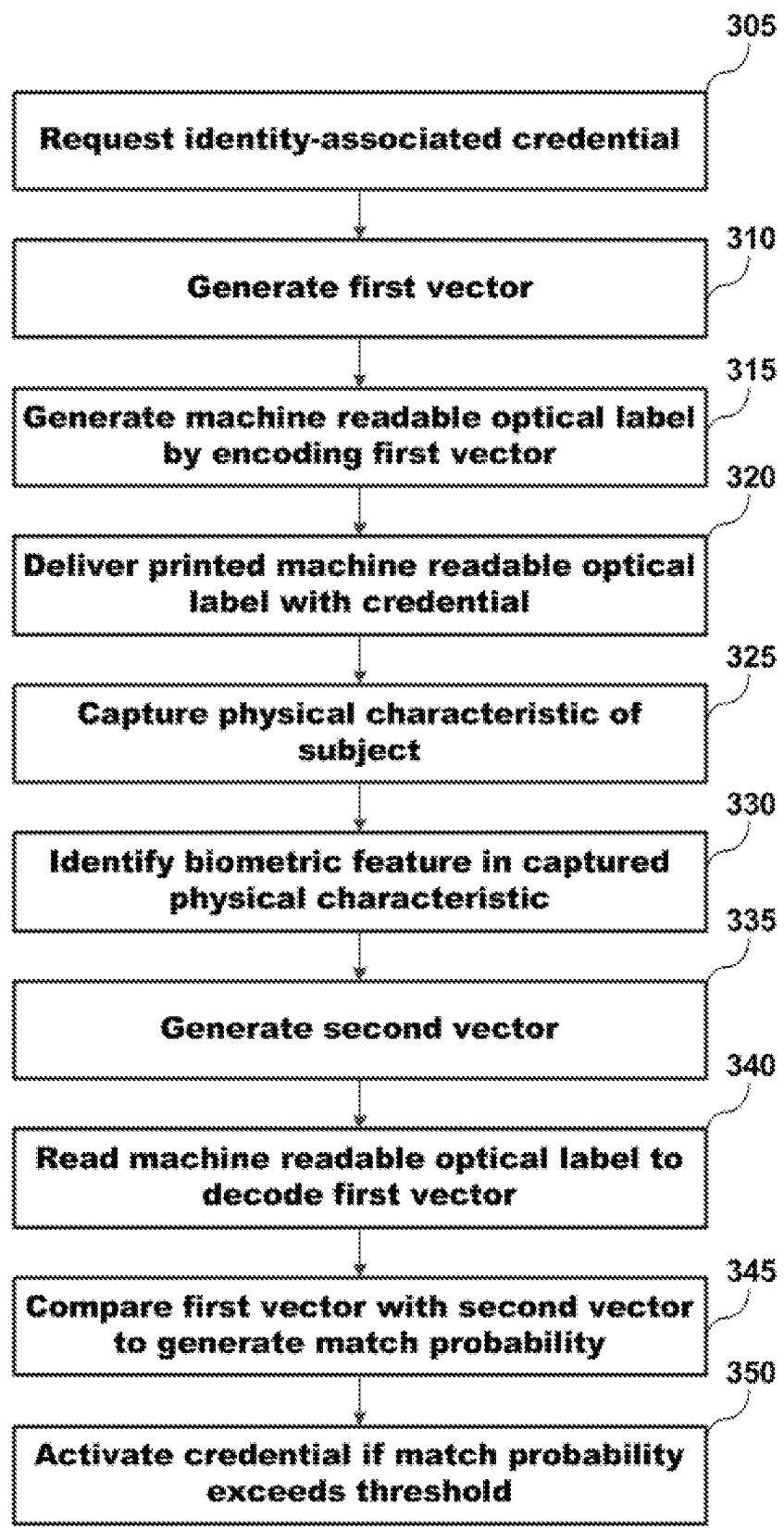
FIG. 3 is a flow chart of a method of activating an identity-associated credential where the machine-readable optical label contains biometric information, according to an example.

FIG. 3 is a flow chart of a method of activating an identity-associated credential where the printed machine-readable optical label contains biometric information, according to an example. In block 305, an identity-associated credential is requested. The user requesting the credential may provide the required biometric information (face, voice, fingerprint, etc. or a combination of any of them). In block 310, a first vector is generated representing the biometric features vector. Thus, the provided biometric information is transformed to a biometric features vector. In block 315, a machine-readable optical label (barcode, QR, etc.) is generated by encoding the first vector. In block 320, at the credential delivery moment, the code is printed in physical format and delivered alongside the credential, in-person or remotely. For credential activation, the user, using a mobile app, a web-service or any other kind of dedicated application, provides his pertinent biometric information, which is captured in block 325. The biometric feature is identified in block 330 and a second biometric features vector is generated in block 335. In block 340 the user reads the machine-readable optical label through the same or any other application, which is also transformed into a biometric features vector. In block 345, both vectors are compared and, if the match probability exceeds a threshold, the credential is activated in block 350.

The abovementioned use process may be used also with one-time use labels. This use case encompasses the previous use case, and refers to the case in which the machine-readable optical label (QR code, etc.) is a one-time use code.

The steps associated with this specialization may include the following:

A particular machine-readable optical label with biometric information is generated at the purchase of the specific credential, at the specific moment, by the specific person, or any other security measure that guarantees the one-time use.

At the moment of label verification, it is checked locally or remotely via mobile app, web service or any other dedicated application that the label has not been used previously or that obeys any other security measure for the one-time use.

In particular, data needed to ensure the one-time use can be encoded within the label as some sort of authentication token. Under these circumstances, biometric authentication can be done locally, avoiding establishing connections to a remote server which could entail security risks and privacy concerns, as no biometric feature is needed to be stored.

This first family of use cases (in its two specializations) provides the following advantages when being compared to a similar protocol without the biometric authentication and the machine-readable optical label use:

A security level is added, besides the presence of the user or the destination address, which is the biometric verification that the user is who claims to be. This is especially critical when the delivery of the credential is done remotely (i.e.: by postal service) or when the document does not present a photograph of the user.

Codification of biometric information in a machine-readable optical label adds security against forgery. In case of credential theft, label generation poses a more difficult challenge than using a photo of the user, or even using passwords.

For the one-time use barcode, an additional security level is added to the previous ones, as it does not allow forgery by using previously obtained or photocopied labels.

Also for the one-time use label, under the particular description with encoded meta-data made before, as required biometric and security information is stored within the credential, biometric authentication can be performed locally, avoiding establishing connections to a remote server, thus avoiding any derived security risk and privacy concerns, as no biometric feature is needed to be stored.

A second family of use cases is about verifying user identity by means of a credential with an in-printed machine-readable optical label, such as id cards, health cards, driving licenses, passports, etc.

Figure 4A:
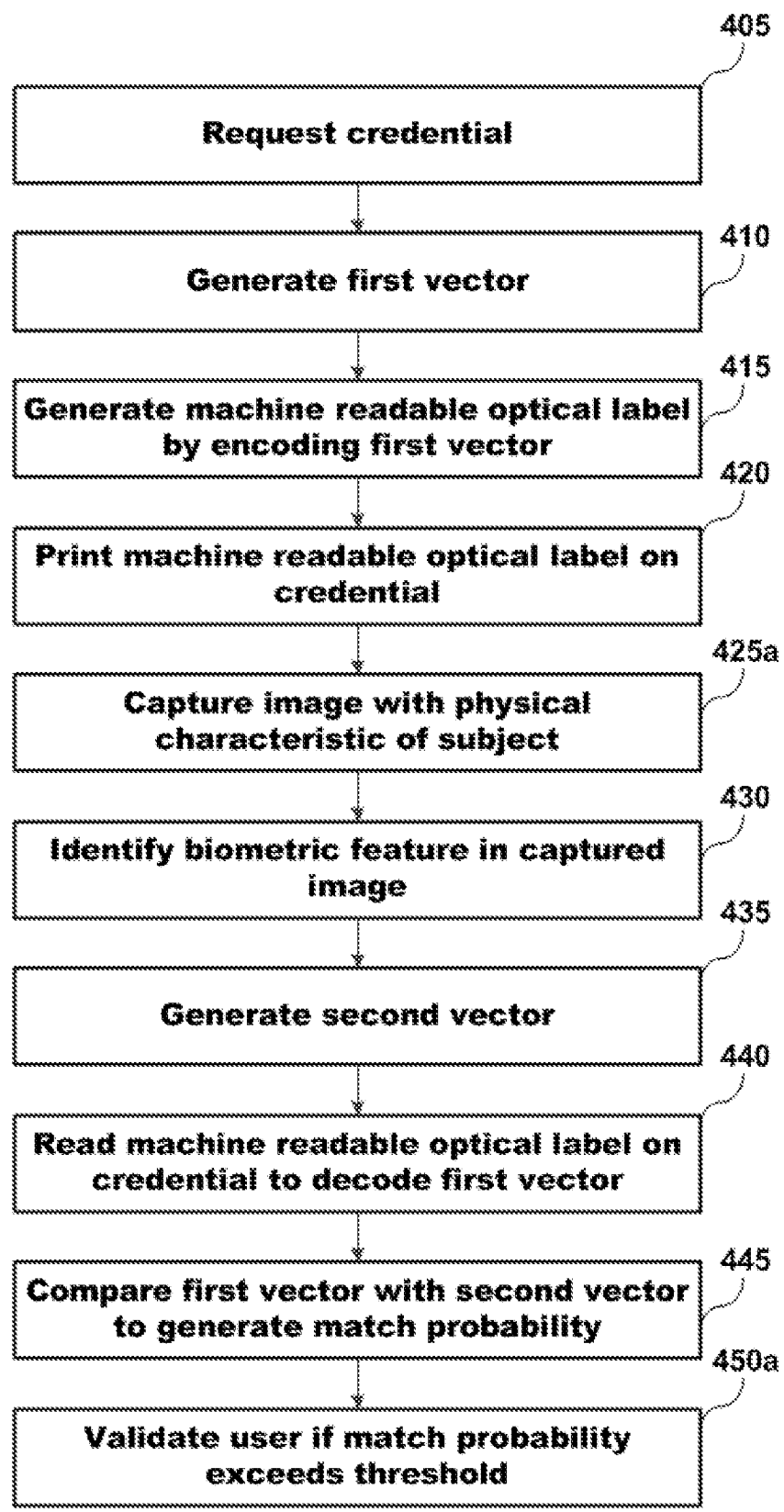
FIG. 4a is a flow chart of a method of validating a user of an identity-associated credential where the machine-readable optical label contains validation information, according to an example.

FIG. 4a is a flow chart of a method of validating a user of an identity-associated credential where the printed barcode contains validation information. In block 405, an identity-associated credential is requested. The user requesting the credential may provide the required biometric information (face, voice, fingerprint, etc. or a combination of any of them) at the moment of request/manufacture of the credential. In block 410, a first vector is generated representing the biometric features vector. Thus, the provided biometric information is transformed to a biometric features vector. In block 415, a machine-readable optical label (barcode, QR, etc.) is generated by encoding the first vector containing the needed credentials for the user to access the biometric authentication process with the information taken at the moment of the request. In block 420, the code is printed in physical format on the identity document. For use and/or identity verification, the user, using a mobile app, a web-service or any other kind of dedicated application, provides his pertinent biometric information, which is captured in block 425a. The biometric feature is identified in block 430 and a second biometric features vector is generated in block 435. In block 440 the printed barcode is read through the same or any other application, which is also transformed into a biometric features vector. In block 445, both vectors are compared and, if the match probability exceeds a threshold, the user is validated in block 450a and the document is considered to belong to the holder.

This use case provides the following advantages with respect to identity verification using credentials without biometric information printed within a machine-readable optical label:

A new level of security in terms of identity verification is added, by assessing biometric information locally or remotely via mobile app, web service or any other dedicated application.

A new level of security in terms of credential forgery protection is added, by using a representation of information which is more difficult to replicate than a photograph.

A new security check can be done over the identity verification document by evaluating the meta-characteristics (see PCT/EP2016/062651) of the printed barcode itself.

For the case in which costs in credential manufacturing are a constraint, printing a black/white code is cheaper than printing a photograph of the user.

For the case in which the photograph of the tenant is also present within the document, this use case adds two more verifications to the baseline case (comparing the holder with the photo): comparing the holder with the barcode and comparing the barcode with the photo.

As biometric information is stored within the credential, biometric authentication can be performed locally, avoiding establishing connections to a remote server, thus avoiding any derived security risk and privacy concerns, as no biometric feature is needed to be stored.

A third family of use cases is about validating a credential with an in-printed machine-readable optical label, such as id cards, health cards, driving licenses, passports, etc.

Figure 4B:
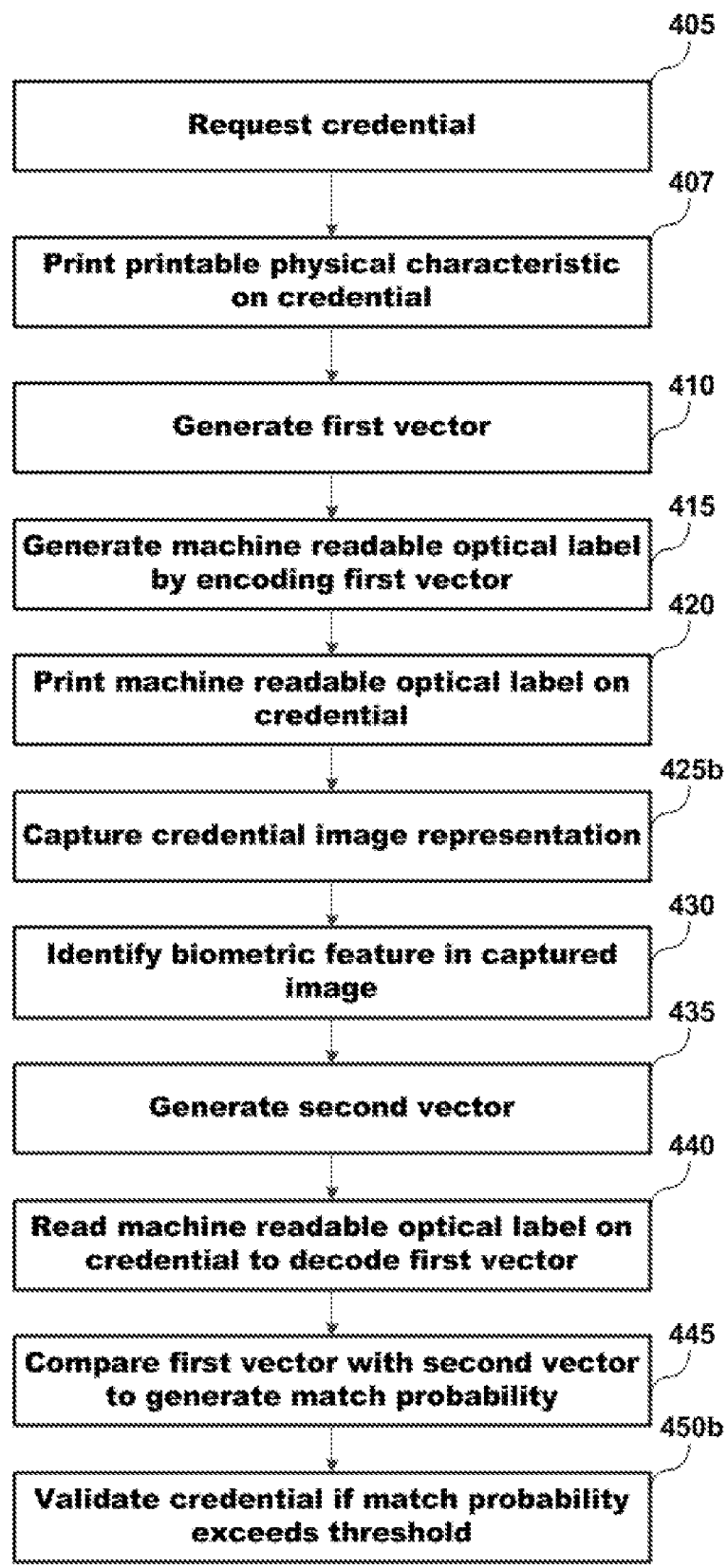
FIG. 4b is a flow chart of a method of validating a credential with an in-printed machine-readable optical label that contains biometric features vectors, according to an example.

FIG. 4b is a flow chart of a method of validating a credential with an in-printed machine-readable optical label that contains biometric features vectors. In block 405, a credential is requested. The user requesting the credential may provide the required biometric information (face, fingerprint, etc. or any combination of printable physical characteristics) at the moment of request/manufacture of the credential. In block 407, a printable physical characteristic is printed on the credential. In block 410, a first vector is generated representing the biometric features vector. Thus, the provided biometric information is transformed to a biometric features vector. In block 415, a machine-readable optical label (barcode, QR, etc.) is generated. In block 420, the code is printed in physical format on the credential. For credential validation, the user, using a mobile app, a web-service or any other kind of dedicated application, provides a credential image representation, which is captured in block 425*b*. The printable physical characteristic printed on the credential is identified in block 430 and a second biometric features vector is generated in block 435. In block 440 the printed barcode is read through the same or any other application, which is also transformed into a biometric features vector. In block 445, both vectors are compared and, if the match probability exceeds a threshold, the credential is validated in block 450*b* and the credential is considered to be legit.

This use case provides the following advantages with respect to credential validation for credentials without using biometric information printed within a label:

A new level of security in terms of identity verification is added, by assessing biometric information locally or remotely via mobile app, web service or any other dedicated application.

A new level of security in terms of credential forgery protection is added, by avoiding spoofing attacks like photo replacement.

A new security check can be done over the identity verification document by evaluating the meta-characteristics (see PCT/EP2016/062651) of the printed barcode itself.

As biometric information is stored within the credential, biometric authentication can be performed locally, avoiding establishing connections to a remote server, thus avoiding any derived security risk and privacy concerns, as no biometric feature is needed to be stored.

A fourth family of use cases is about validating identity with short-timespan use credentials. This use case applies to credentials meant to be used once or during a limited time span, such as: transport tickets, tickets for sports events, cultural events, tickets for entering a particular place, etc. Holder identity will be validated using a machine-readable optical label (QR code, etc.) present in the credential, in which biometric information (face, voice, fingerprint, etc.) will be encoded. Identity validation will be done locally or remotely using a mobile app, a web service or any other dedicated application.

For this use case, three particularizations A, B and C are considered:

A. Credential belongs to a particular person:

This use case applies to short-timespan credentials that present information about the tenant. Such cases would be: conference credential, VIP pass credentials, etc. Under this use case, biometric authentication will be done following these steps:

At the moment of credential acquisition, biometric information (face, voice, fingerprint, etc. or any combination of them) from the customer is extracted locally or remotely through a mobile app, web service or any other dedicated application.

Biometric information is transformed to a biometric features vector, which is later encoded into a machine-readable optical label (QR code, etc.)

The barcode is attached within the credential.

At the moment of using the credential, pertinent biometric information is extracted from the customer and transformed into a biometric features vector. This process can be done locally or remotely via a mobile app, a web service or any other dedicated application.

The label from the credential is read and decoded into a biometric features vector.

Both vectors are compared and, if the match probability exceeds a threshold, the credential is validated.

B. Credential obtained for a different person/group of persons:

This use case covers the situation in which a particular buyer purchases credentials in name of another user, or to a group of users.

Under this use case, biometric authentication follows similar steps than in the previous particularization.

However, some differences appear:

After the credential acquisition, the user is provided with the needed information (a particular code, password or any system of the sort) to allow a future access to the credential generation system for any of the beneficiaries of the purchase.

Then, each of the beneficiaries of the purchase, by using the provided particular code, password or system of the sort, perform a process in which biometric information (face, voice, fingerprints, etc. or any combination of them) is extracted from them, locally or remotely through a mobile app, a web service or any other dedicated application.

Biometric information is transformed to a biometric features vector, which is later encoded into a machine-readable optical label (QR code, etc.).

The new credential is then generated, with the label within.

At the moment of using the credential, pertinent biometric information is extracted from the customer and transformed into a biometric features vector. This process can be done locally or remotely via a mobile app, a web service or any other dedicated application.

The label from the credential is read and decoded into a biometric features vector.

Both vectors are compared and, if the match probability exceeds a threshold, the credential is validated.

C. One-time use machine-readable optical labels:

This use case encompasses the previous two use cases, and refers to the case in which the machine-readable optical label (QR code, etc.) is a one-time use label.

The steps associated with this specialization may include the following:

A particular machine-readable optical label with biometric information is generated for the purchase of the specific credential, at the specific moment, by the specific person, or any other security measure that guarantees the one-time use.

At the moment of label verification, it is checked locally or remotely via mobile app, web service or any other dedicated application that the label has not been used previously or that obeys any other security measure for the one-time use.

In particular, data needed to ensure the one-time use can be encoded within the barcode as some sort of authentication token. Under these circumstances, biometric authentication can be done locally, avoiding establishing connections to a remote server which could entail security risks and privacy concerns, as no biometric feature is needed to be stored.

This fourth family of use cases (and its specializations) provides the following advantages compared with the current short-timespan credential verification by verifying a code.

A new security level is added to the credential verification process, added to the "something that the user has" verification, it is verified "something that the user is", which is implied in the credential printing, thus protecting against forgery and ticket touts.

A new security level is added to the identity verification process, thus protecting the customer against theft, being necessary a biometric authentication process to validate the credential.

As biometric information is stored within the credential, biometric authentication can be performed locally, avoiding establishing connections to a remote server, thus avoiding any derived security risk and privacy concerns, as no biometric feature is needed to be stored.

For the one-time use machine-readable optical label, an additional security level is added to the previous ones, as it does not allow forgery by using previously obtained or photocopied labels.

A family of use cases is about accessing computer terminals or applications with a machine-readable optical label. This use case applies to accessing to computer terminals, computer applications or any other system that requires a process of user validation by using a label (QR code, etc.) which encodes biometric information (face, voice, fingerprints, etc.) from the user which is going to be validated.

Figure 5:
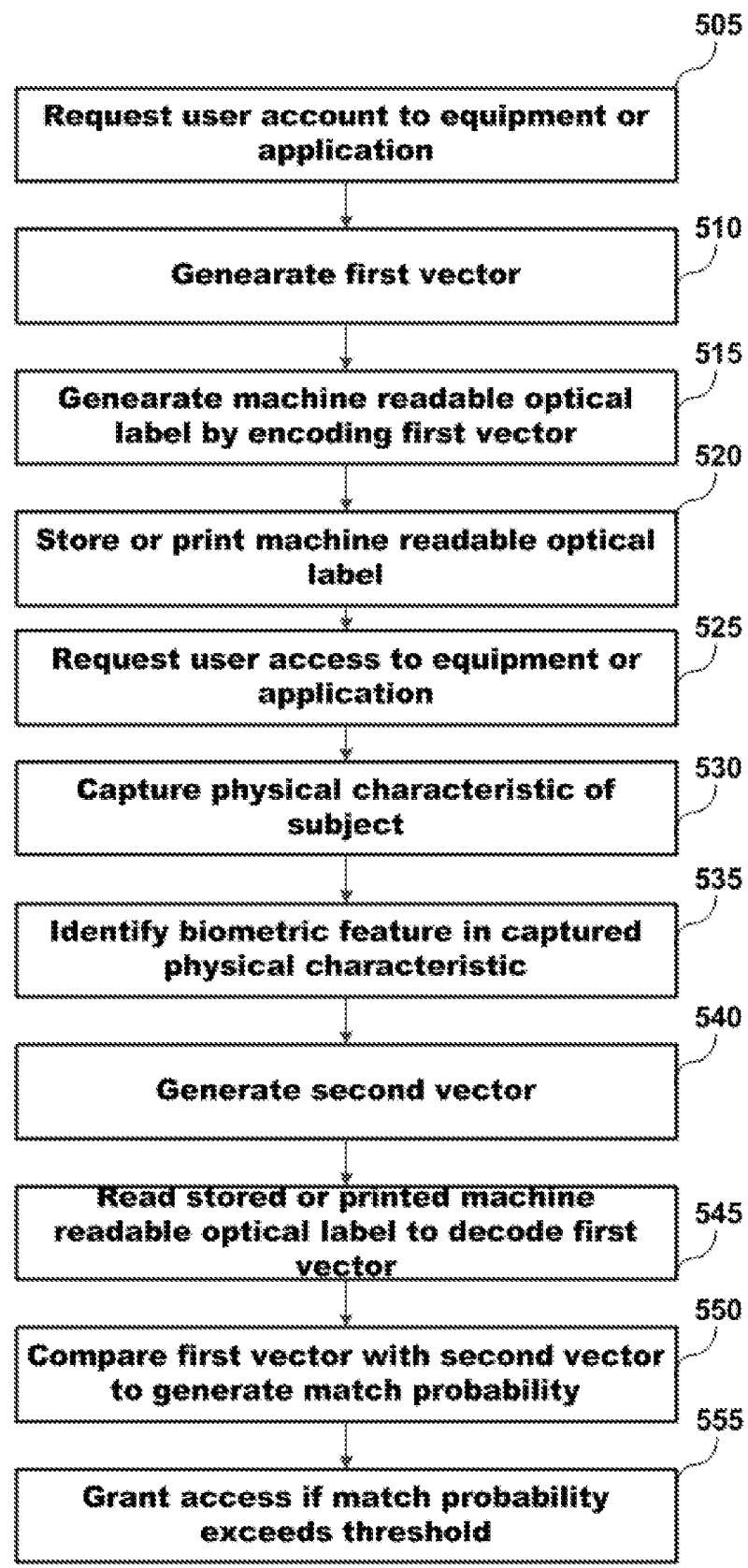
FIG. 5 is a flow chart of a method of accessing computer terminals, communication device equipment or communication device applications, according to an example.

FIG. 5 is a flow chart of a method of accessing computer terminals, communication device equipment or communication device applications, according to an example. In block 505, a user account is requested and user information for creating the account is requested. Then, biometric information (face, voice, fingerprints, etc. or any combination of them) is extracted locally or remotely by using a mobile app, a web service or any other dedicated application. In block 510, biometric information is transformed to a biometric features vector. In block 515, said vector is then encoded into a machine-readable optical label (QR code, etc.). In block 520, the label is provided to the user in order to be printed, stored into a terminal with output visual interface, etc. In block 525, at the moment of user authentication at the computer terminal or application, pertinent biometric information from the user is requested, which is captured in block 530. The biometric feature is identified in block 535 and a second biometric features vector is generated in block 540. In block 545 the printed or stored label is read through the same or any other application, which is also transformed into a biometric features vector. In block 550, both vectors are compared and, if the match probability exceeds a threshold, access is granted, in block 555 to the terminal, system, equipment or app.

This use case can be applied to accessing computer terminals or to perform sensitive operations with a bank account; either as an authentication procedure itself or as an addition to the password-based authentication. An example of such situation would be performing biometric authentication making use of a previously provided machine-readable optical label, in-printed within a typical code card. It can also be used to allow access to automatic teller machines (ATM) by following the previously described procedure. Thus, this use case provides the following advantages, in comparison with a traditional password-based access control:

As an addition to a password-based access control, it provides two additional security levels, being verified "something that the user knows" (password), "something that the user is" (biometric information) and "something that the user has" (the machine-readable optical label).

As an alternative to a password-based control system, it provides an additional security level, as "something that the user has" and "something that the user is" is verified. Moreover, it provides advantages under cases in which the user presents memorization difficulties.

A sixth family of use cases is about premises secure identification of service providers. This use case applies authorization of service providers that perform in-premises activities, such as electricians, plumbers, telecom technicians, etc. Together with a security access device (i.e.: electronic peephole), service provider identity will be validated using a machine-readable optical label (QR code, etc.) present in the provider's credential, in which biometric information (face, voice, fingerprint, etc.) will be encoded. The security access device may communicate with another device (a mobile app, a web service or any other dedicated application) in order to perform the biometric authentication process.

Figure 6:
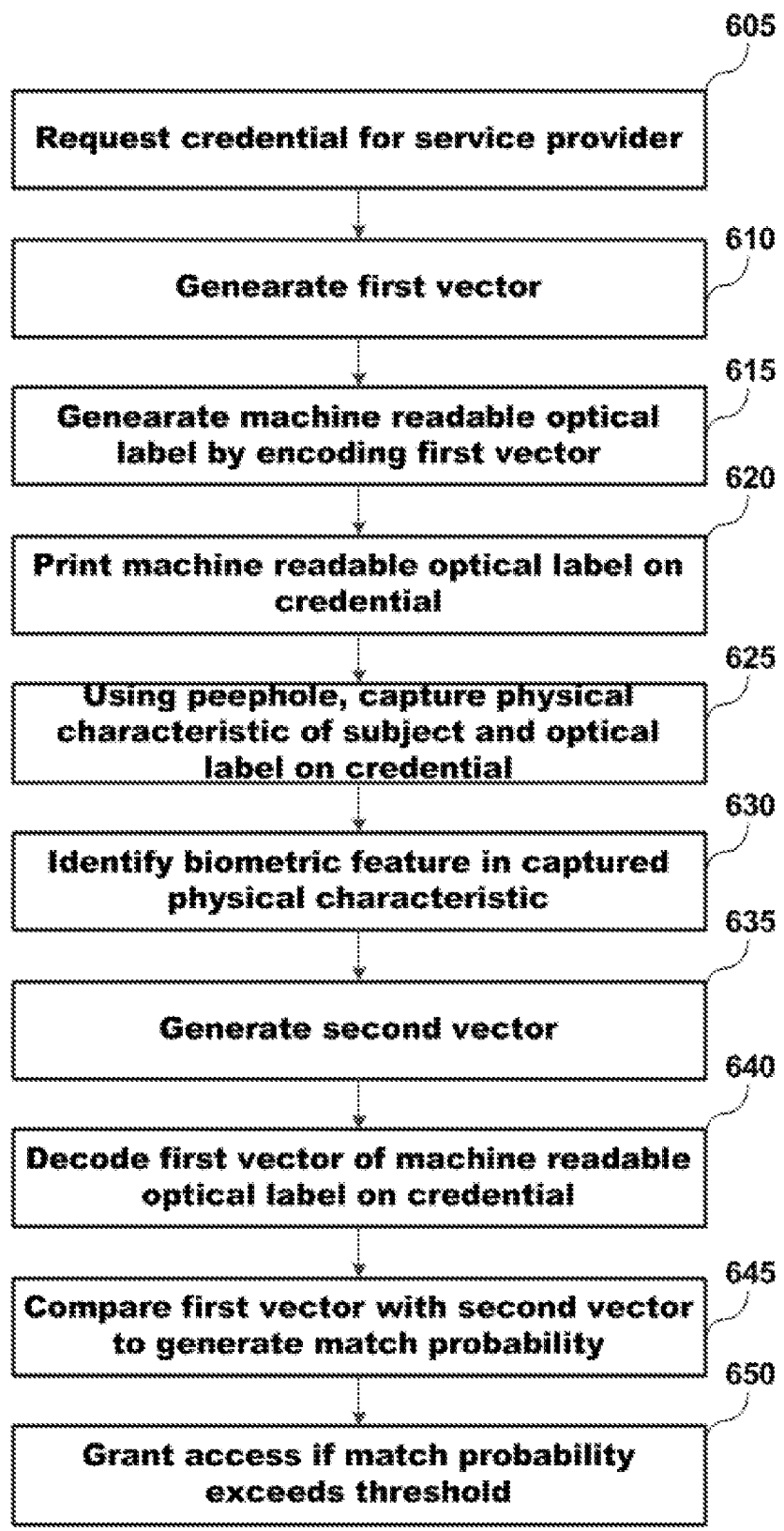
FIG. 6 is a flow chart of a method of authorizing access to service providers, according to an example.

FIG. 6 is a flow chart of a method of authorizing access to service providers, according to an example. In block 605, an identity-associated credential is requested for the service to be performed. The service provider requesting the credential may provide the required biometric information (face, voice, fingerprint, etc. or a combination of any of them) at the moment of request/manufacture of the credential. In block 610, a first vector is generated representing the biometric features vector. In block 615, a machine-readable optical label (barcode, QR, etc.) is generated by encoding the first vector containing the needed credentials for the user to access the biometric authentication process with the information taken at the moment of the request. In block 620, the code is printed in physical format on the credential. For use and/or identity verification, the service provider provides his pertinent biometric information and the optical label (QR code) to an electronic peephole at the premises where the service provider requests access. The pertinent biometric information is captured in block 625. The biometric feature is identified in block 630 and a second vector representing the biometric feature is generated in block 635. In block 640 the printed barcode read through the electronic peephole is also transformed into a biometric features vector. In block 645, both vectors are compared and, if the match probability exceeds a threshold, access is granted, in block 650.

In an alternative use case, one-time use machine-readable optical labels may be used. This use case encompasses the previous use case, and refers to the case in which the label (QR code, etc.) is a one-time use label.

The steps associated with this specialization may include the following:

A particular machine-readable optical label with biometric information is generated for a one-time use service provider credential, made for a specific service at a specific place, or any other security measure that guarantees the one-time use.

At the moment of label verification, it is checked locally or remotely via mobile app, web service or any other dedicated application that the label has not been previously used or that obeys any other security measure for the one-time use.

In particular, data needed to ensure the one-time use can be encoded within the label as some sort of authentication token. Under these circumstances, biometric authentication can be done locally, avoiding establishing connections to a remote server which could entail security risks and privacy concerns, as no biometric feature is needed to be stored.

This sixth family of use cases provides the following advantages, in comparison with a traditional credential-based in-place supervised access control:

As an alternative to a supervised access control, it allows to perform a secure identity verification without in-place supervised access control.

Codification of biometric information in a machine-readable optical label adds security against credential forgery. In case of credential theft, label generation poses a more difficult challenge than using a photo of the user, or even using passwords.

As biometric information is stored within the credential, biometric authentication can be performed locally, avoiding establishing connections to a remote server, thus avoiding any derived security risk and privacy concerns, as no biometric feature is needed to be stored.

For the one-time use label use case, an additional security level is added to the previous ones, as it does not allow forgery by using previously obtained or photocopied QR codes.

Figure 7:
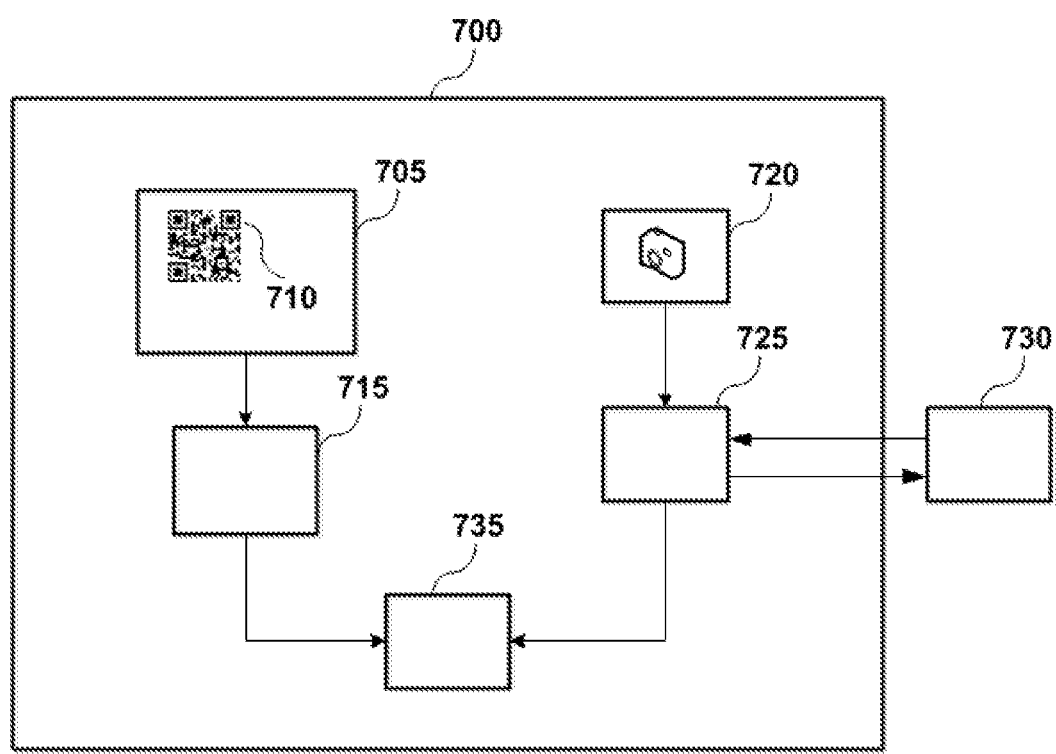
FIG. 7 schematically illustrates a device for biometric verification, according to an example.

FIG. 7 schematically illustrates a device for biometric verification, according to an example. The device 700 may comprise a memory 705 to store an image of a machine-readable optical label 710. The machine readable optical label 710 may comprise a representation of a biometric feature of a subject. The device 700 may further comprise a capturing module 720 to capture a physical characteristic of the subject. The physical characteristic captured may contain a different instance of the same biometric feature of the subject as the one represented by the machine readable optical label 710. The device may further comprise a decoding module 715 to decode the machine-readable optical label 710 and to reproduce a first vector. The device 700 may further comprise a biometric gateway 725 to generate a second vector based on the biometric feature contained in the captured physical characteristic. The biometric gateway 725 may be connected (locally or remotely) to a biometric engine 730. Alternatively, the biometric gateway may comprise the biometric engine 730. The device 700 may also comprise a comparing module 735 to compare the first and the second vectors and to compute a match probability.

Although only a number of examples have been disclosed herein, other alternatives, modifications, uses and/or equivalents thereof are possible. Furthermore, all possible combinations of the described examples are also covered. When talking about generating and decoding the machine-readable optical label, it is not limited to only one label instance, but it is possible to represent the information in multiple labels depending on the use case. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

Furthermore, although the examples described with reference to the drawings comprise computing apparatus/systems and processes performed in computing apparatus/systems, the invention also extends to computer programs, particularly computer programs on or in a carrier, adapted for putting the system and method into practice.

The invention claimed is:

1. Method for biometric verification, comprising:
generating a first vector representing a biometric feature of a subject;
generating a machine-readable optical label based on the generated first vector;
capturing a physical characteristic representative of the subject, the physical characteristic containing the biometric feature of the subject;
identifying the biometric feature in the captured physical characteristic;
generating a second vector representing the identified biometric feature;
reading the machine-readable optical label to decode the first vector;
comparing the first vector with the second vector to generate a match probability;
wherein generating at least one of the first or the second vector comprises using a biometric engine;
the method further comprising adding version information of the biometric engine to the generated machine-readable optical label to produce biometric engine version information;
decoding the biometric engine version information from the machine-readable optical label to produce a decoded biometric engine version and using the decoded biometric engine version to configure the biometric engine to generate the second vector.

2. The method according to claim 1, wherein generating the first vector comprises:
capturing a different instance of a physical characteristic representative of the subject.

3. The method according to claim 1, wherein reading the machine-readable optical label to decode the first vector comprises:
verifying the machine-readable optical label authenticity by means of meta-characteristics.

4. The method according to claim 1, wherein capturing a physical characteristic comprising capturing one or more of an image, an audio, a video, a biological, or a chemical sample of the subject.

5. The method according to claim 4, wherein capturing an image comprises capturing an image with one or more of a portion of a face, of a palm, of a fingerprint, of an eye, of ears, of a nose, of teeth, of a tongue, of palm veins pattern, or of finger veins pattern, of the subject.

6. The method according to claim 1, wherein generating a machine-readable optical label comprises generating a two-dimensional barcode.

7. The method according to claim 6, wherein generating a two-dimensional barcode comprises generating a quick-response code.

8. The method according to claim 1, wherein generating a first or a second vector comprises automatically generating the first or second vector using a biometric engine.

9. The method according to claim 1, further comprising encrypting the first and/or the second vector.

10. The method according to claim 1, further comprising adding non-biometric information to the machine-readable optical label, wherein said non-biometric information comprises one or more of personal data, capture device data, capture timestamp data, access permission data, location permission data, and/or expiration rules data.

11. The method according to claim 1, further comprising:
generating the first vector when requesting an identity-associated credential;
transferring an image of the machine-readable optical label on a document accompanying the identity-associated credential;
generating the second vector when receiving the identity-associated credential and the accompanying document;
reading the machine-readable optical label from the accompanying document to decode the first vector;
activating the identity-associated credential if the match probability exceeds a threshold.

12. The method according to claim 1, further comprising:
printing a printable physical characteristic of a subject on a credential containing an in-printed biometric machine-readable label;
transferring an image of the machine-readable optical label printed on the credential;
reading the machine-readable optical label from the credential to decode the first vector;
identifying the biometric feature in the printable physical characteristic;
generating the second vector representing the identified biometric feature;
validating the credential if the match probability exceeds a threshold.

13. The method according to claim 1, further comprising:
transferring an image of the machine-readable optical label printed on a credential;
reading the machine-readable optical label from the credential to decode the first vector;
validating a user identity if the match probability exceeds a threshold.

14. The method according to claim 1, further comprising:
generating the machine-readable optical label at a moment of creating subject user information to access a computer terminal, communication device or communication device application;
storing or printing the generated machine-readable optical label;
to access the computer terminal, communication device or communication device application:
  providing the stored or printed machine-readable optical label to the computer terminal, communication device or communication device application;
  reading the machine-readable optical label to decode the first vector;
  capturing by the computer terminal, communication device or communication device application a physical characteristic representative of the subject, the physical characteristic containing the biometric feature of the subject;
  generating the second vector representing the biometric feature;
  identifying the subject by comparing the first vector with the second vector.

15. The method according to claim 1, further comprising:
generating a credential with the machine-readable optical label printed on the credential;
using an electronic peephole to read the machine-readable optical label and to capture a physical characteristic representative of the subject, the physical characteristic containing the biometric feature of the subject;
sending the read machine-readable optical label and the captured physical characteristic to a remote processing device;
generating and comparing first and second vectors at the remote device;
authorizing access of service providers if the match probability exceeds a threshold.

16. A method of verifying identity with short-timespan use credentials by performing a method of biometric verification of a subject comprising:
generating a first vector representing a biometric feature of a subject;
generating a machine-readable optical label based on the generated first vector;
capturing a physical characteristic representative of the subject, the physical characteristic containing the biometric feature of the subject;
identifying the biometric feature in the captured physical characteristic;
generating a second vector representing the identified biometric feature;
reading the machine-readable optical label to decode the first vector;
comparing the first vector with the second vector to generate a match probability;
wherein generating at least one of the first or the second vector comprises using a biometric engine;
the method of biometric verification of a subject further comprising adding biometric engine version information to the generated machine-readable optical label;
decoding the biometric engine version information from the machine-readable optical label to produce a decoded biometric engine version and using the decoded biometric engine version to configure the biometric engine to generate the second vector;
the method of verifying identity further comprising:
transferring an image of the machine-readable optical label printed on the short-timespan use credential;
reading the machine-readable optical label from the short-timespan use credential to decode the first vector;
verifying the short-timespan rule data accomplishment; and
verifying the identity of the subject if the match probability exceeds a threshold.

17. The method according to claim 16, further comprising:
generating a temporary credential;
providing to a first subject the temporary credential and access data to access system to perform capturing of a physical characteristic of a second subject;
generating the first vector of the second subject and respective machine-readable optical label based on the generated first vector;
generating short-timespan use credential by transferring the image of the machine-readable optical label printed on the short-timespan use credential.

18. A device for biometric verification comprising:
a memory to store a machine-readable optical label, the machine-readable optical label comprising a representation of a biometric feature of a subject;
a capturing module to capture a physical characteristic representative of a subject, the physical characteristic containing the biometric feature of the subject;
a decoding module to decode the machine-readable optical label and to reproduce a first vector;
a biometric gateway to provide biometric features vectors based on the captured physical characteristic;
a comparing module to compare the biometric features vectors and to compute a match probability;

wherein generating at least one of the first or the second vector comprises using a biometric engine;

the device further comprising an adding module to add a version information of the biometric engine to the machine-readable optical label;

a decoding module to decode the biometric engine version information from the machine-readable optical label to produce a decoded biometric engine version and using the decoded biometric engine version to configure the biometric engine to generate the second vector.

\* \* \* \* \*